United States Patent [19]

Tamaru et al.

[11] Patent Number: 5,217,666
[45] Date of Patent: Jun. 8, 1993

[54] PROCESS FOR PRODUCING POROUS POLYTETRAFLUOROETHYLENE FILM

[75] Inventors: Shinji Tamaru; Hirofumi Nishibayashi; Katsutoshi Yamamoto; Osamu Tanaka; Osamu Inoue, all of Settsu, Japan

[73] Assignee: Daikin Industries Ltd., Osaka, Japan

[21] Appl. No.: 889,187

[22] Filed: May 28, 1992

[30] Foreign Application Priority Data

May 29, 1991 [JP] Japan .................. 3-125944
May 29, 1991 [JP] Japan .................. 3-125945

[51] Int. Cl.$^5$ .......................................... B29C 55/02
[52] U.S. Cl. ...................................... 264/112; 264/119; 264/127
[58] Field of Search .............. 264/112, 119, 127, 288.8

[56] References Cited

U.S. PATENT DOCUMENTS

| | | | |
|---|---|---|---|
| 4,277,429 | 7/1981 | Okita | 264/127 |
| 4,576,861 | 3/1986 | Kato | 428/316.6 |
| 4,596,837 | 6/1986 | Yamamoto et al. | 521/145 |
| 4,659,528 | 4/1987 | Plowman et al. | 264/49 |
| 5,064,593 | 11/1991 | Tamaru et al. | 264/113 |
| 5,071,610 | 12/1991 | Hagen et al. | 264/120 |

FOREIGN PATENT DOCUMENTS

| | | |
|---|---|---|
| 51-18991 | 6/1976 | Japan . |
| 54-97686 | 8/1979 | Japan . |
| 55-22504 | 6/1980 | Japan . |
| 57-131236 | 8/1982 | Japan . |
| 59-152825 | 8/1984 | Japan . |
| 61-61827 | 3/1986 | Japan . |
| 63-48562 | 9/1988 | Japan . |
| 64-34407 | 2/1989 | Japan . |

*Primary Examiner*—Mary Lynn Theisen
*Attorney, Agent, or Firm*—Birch, Stewart, Kolasch & Birch

[57] ABSTRACT

A porous PTFE film having a thin thickness and good permeability is produced by coating an emulsion of polytetrafluoroethylene on a substrate surface, in particular, a porous polytetrafluoroethylene substrate which has not been heated at a melting point of unsintered polytetrafluoroethylene or higher, heating the coated substrate at a temperature not lower than a melting point of sintered polytetrafluoroethylene to semi-sinter polytetrafluoroethylene, optionally removing the semi-sintered polytetrafluoroethylene film from the substrate, and then stretching the semi-sintered film at least in one direction.

10 Claims, 5 Drawing Sheets

FIG. 1

PROCESS FOR PRODUCING POROUS POLYTETRAFLUOROETHYLENE FILM

BACKGROUND OF THE INVENTION

1. Field of the Invention

The present invention relates to a novel process for producing a porous polytetrafluoroethylene (hereinafter referred to as "PTFE") film. More particularly, the present invention relates to a process for producing a porous PTFE film having large reduced flow rates for various fluids and a narrow pore size distribution, in particular, a porous PTFE film having at least two layers which have different average pore sizes and are completely integrated together at their interface.

2. Description of the Prior Art

A porous PTFE film is widely used, for example, as a fine filtration filter medium for various gases and liquids in various fields, in particular, in the semiconductor industry, a concentration film for fruit juices in the food industry, and a separation and purification film in the fermentation industry.

Since PTFE has good chemical resistance, its porous film is used as a filtration filter medium of corrosive gasses and liquids and a separator in a cell for the separation of an electrolyte.

To provide a good filtration filter medium, the porous PTFE film should have a narrow pore size distribution and a large permeation amount per unit time for various fluids. It is known that, when a porosity or a pore size is constant, the permeation amount of the fluid depends on a thickness of the film. That is, as the film thickness decreases, the permeation amount increases. However, when the film thickness is made thin, the porous PTFE film tends to be deformed or the pore size tends to be changed by pressure during filtration. In an extreme case, the film is broken and does not work as the filtration filter. Further, a very thin porous film has very poor handleability, so that it may be damaged when it is process to assemble a filter module or it is set in a filter holder.

Hitherto, as processes for producing a porous PTFE film, following processes are known:

(1) A process comprising paste extruding or press molding an emulsion polymerized PTFE to obtain an unsintered body of PTFE and then stretching it to obtain a porous material (Japanese Patent Publication No. 18991/1976) or a process comprising stretching a semi-sintered PTFE material (Japanese Patent Kokai Publication No. 152825/1984).

To produce a thin porous film of PTFE, a draw ratio is made large when a thickness of the unstretched film is the same, or a thickness of the unstretched film is made as thin as possible when the draw ratio is the same.

Since the average pore size will increases as the draw ratio increases, to maintain a pore size suitable for the functions of the porous film, the extremely large draw ratio cannot be employed. On the other hand, the thickness of the unstretched film which is prepared by paste extrusion or press molding has a lower limitation, though it has been tried to decrease the thickness.

(2) A process comprising stretching a semi-sintered PTFE material consisting of PTFE particles to obtain a porous PTFE article (Japanese Patent Kokai Publication No. 61827/1986). However, by this process, it is difficult to produce a thin film product since the PTFE particles are used.

(3) A process comprising forming a homogeneous mixture of a PTFE resin dispersion and a fiber-forming polymer and removing the fiber-forming polymer from a formed product to obtain a porous film (Japanese Patent Kokai Publication No. 34407/1989). However, the porous film produced by this process is not suitable for the semiconductor industry and the food industry since impurities such as inorganic and organic materials tend to contaminate the semiconductor or the food. In addition, steps of this process are complicated.

To provide a porous PTFE film having a thin thickness and a large transmission amount per unit time, some multi-layer porous films of PTFE comprising a filtering layer having a small pore size and a supporting layer having a larger pore size than that of the filtering layer have been proposed.

As processes for preparing such multi-layer films, following processes have been proposed:

(i) A process comprising laminating and contact bonding at least one porous PTFE film having a small pore size both in unsintered states and at least one porous PTFE film having a large pore size and heating and sintering the laminate product at a temperature higher than a melting point of PTFE to obtain a multi-layer porous PTFE film (Japanese Patent Kokai Publication No. 97686/1979).

(ii) A process comprising stretching an unsintered PTFE film between a low rotational speed roll and a high rotational speed roll while establishing a temperature difference and a compressive force in a direction of the film thickness to produce a porous film having different pore sizes on two surfaces of the film (Japanese Patent Publication No. 48562/1988).

Although it is for the production of a separation and concentration film of an isotope mixture gas but not for the production of the fine filtration filter, the following process is proposed for the production of a microporous separation film:

(iii) A process comprising laminating at least one PTFE thin film containing a pore-forming liquid agent and at least one other PTFE thin film containing a pore-forming liquid agent, pressing them to adhere and extracting the pore-forming liquid agents to form pores, whereby a multi-layer PTFE film comprising at least two layers which have different average pore sizes is produced (Japanese Patent Publication No. 22504/1980).

The above process (i) requires steps for separately producing at least two sheets or films having different porosities and for sintering the sheets or films while laminating and contact pressing them. To laminate very thin films or films having very small strength in the industrial scale production, very expensive equipment and very high skill are necessary in view of formation of wrinkles or breakage of the films.

The process (ii) stretches the films between the rolls in only one direction and cannot be used for biaxial stretching.

In the process (iii), the multi-layer film having different average pore sizes in the different layers is produced using a difference of packing densities of the emulsion polymerized PTFE powders which have different primary particle sizes and shapes, and a difference of types of the pore-forming agents to be used. However, the formed pores consist of spaces between the PTFE particles. This is explained in detail. An unsintered product produced by paste extrusion of the emulsion polymerized PTFE polymer particles has a structure like a closest packing material of primary particles. A specific gravity of the primary particles is from 2.1 to 2.3, while a specific gravity of the product as a whole is from 1.5 to 1.6 when the product is produced using a petroleum base solvent. The difference between the specific gravities is due to the spaces, and the spaces between the particles form pores. Anyway, the film having such structure has a very poor fluid permeating property as a filter, and its strength is very low in comparison to a sintered material. But, when the multi-layer porous film is sintered to increase the strength, the film becomes poreless so that it cannot be used as a fluid filter.

Japanese Patent Kokai Publication No. 131236/1982 proposes a process for producing a multi-layer porous film comprising laminating rolled PTFE sheets containing an additive, further rolling the laminate and stretching it. Though the porous film produced by this process has high strength, there is no difference of the pore size between the layers.

An asymmetric film comprising a very thin filter layer and a supporting layer having a pore size larger than that of the filter layer can be produced from cellulose acetate or polysulfone. Since this asymmetric film is produced by a wet coagulation method, a material of the film should be soluble in a solvent. Therefore, this process cannot be applied to PTFE which is insoluble in any solvent.

SUMMARY OF THE INVENTION

One object of the present invention is to provide a process for producing a PTFE porous film which has good permeability with various fluids and contains no or little impurities.

Another object of the present invention is to provide a process for producing a PTFE porous film having an asymmetric pore size profile in which layers are completely integrated together and which has good permeability with various gases and liquids.

According to a first aspect of the present invention, there is provided a process for producing a porous PTFE film comprising coating an emulsion of PTFE on a substrate surface, heating the coated substrate at a temperature not lower than a melting point of sintered PTFE to semi-sinter PTFE, optionally removing the semi-sintered PTFE film from the substrate, and then stretching the semi-sintered film at least in one direction. Preferably, the substrate has a smooth surface, and the semi-sintered PTFE film is removed from the substrate and stretched.

According to a second aspect of the present invention, there is provided a process for producing a multi-layer porous PTFE film comprising at least two layers having different average pore sizes, which process comprises coating an emulsion of PTFE on a porous PTFE film which has not been heated at a melting point of unsintered PTFE or higher, heating a coated PTFE film at a temperature not lower -than a melting point of sintered PTFE to semi-sintered PTFE, and stretching the film at least in one direction.

DETAILED DESCRIPTION OF THE INVENTION

Figure 1:
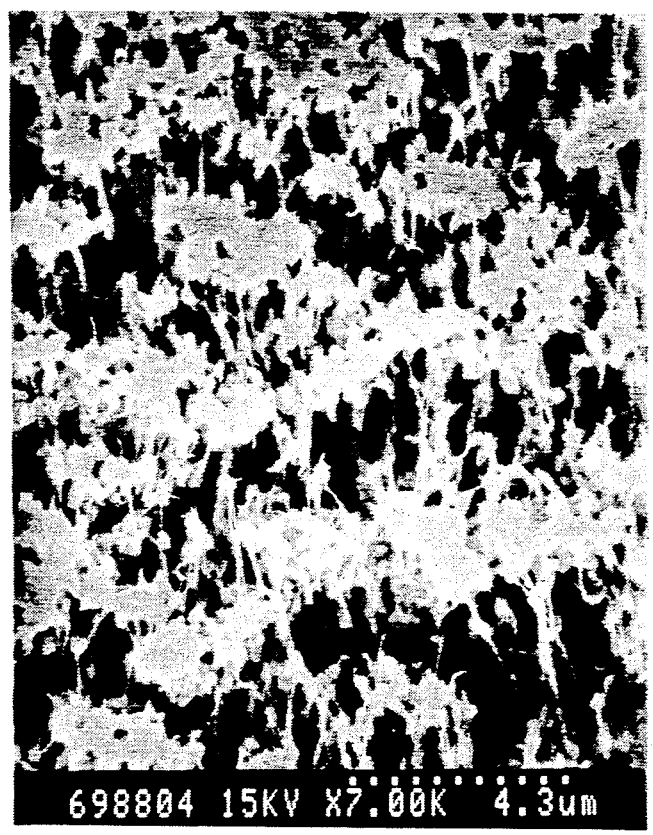
FIGS. 1, 2 and 3 are scanning electron microscopic photographs (magnification: 7000 times) of porous PTFE films produced in Examples 1, 2 and 3, respectively.

Now, the present invention according to the first aspect is explained in detail.

In the first process of the present invention, the emulsion of PTFE is coated on a surface of the substrate, preferably, a smooth surface of the substrate.

PTFE particles in the emulsion have a particle size of at least 240, preferably at least 300, in terms of a particle size calculated from turbidity (hereinafter referred to as "turbidity particle size"). The emulsion is preferably prepared by adding a surfactant to a mixture of PTFE particles in water, stirring the mixture, keep it standing, and removing a supernatant to concentrate it. Preferably, the emulsion has a resin solid content of at least 60 % by weight.

When the turbidity particle size is less than 240 or when the solid content in the emulsion is lower than 60 the coated film tends to be cracked in a drying step or a semi-sintering step.

The emulsion may contain a surfactant which improves dispersibility of the PTFE particles, a thickener which adjust a thickness of a coated emulsion, or a filler which controls strength of the film.

There is no specific limitation on the substrate on which the PTFE emulsion is coated. Preferably, the substrate has a smooth surface. In view of easy availability, a glass plate is preferred. For continuous production, a film of, for example, polyimide may be used.

As coating means, any of conventional means such as a bar coater, a doctor knife or a curtain coater may be used.

If necessary, the coated PTFE emulsion film is dried by a conventional method to remove water. To prevent cracking of the film, preferably the coated emulsion film is air dried and dried in an IR drier at a temperature not higher than 100° C.

The dried film is then semi-sintered.

The semi-sintering may be carried out by a process disclosed in Japanese Patent Kokai Publication No. 152825/1984 and U.S. Pat. No. 4,596,837, the disclosure of which is herein incorporated by reference.

That is, the film is semi-sintered by heating it at a temperature not lower than the melting point of sintered PTFE (about 327° C.) and preferably not higher than the melting point of unsintered PTFE (about 347° C.).

A heating time depends on various factors such as a heating temperature, a thickness of a film to be heated, and others. In general, when the heating temperature is high, the heating time is short, and when the film thickness is large, the heating time is long. At this stage, the semi-sintered coating film has a crystalline conversion of 0.3 to 0.9, preferably 0.35 to 0.9. The crystalline conversion is defined in U.S. Pat. No. 4,596,837, the disclosure of which is herein incorporated by reference. When the crystalline conversion is smaller than 0.3, it is difficult to remove the semi-sintered coating film from the substrate. When the crystalline conversion is larger than 0.9, stretching of the removed coating film is difficult.

Finally, the semi-sintered film is removed from the substrate and stretched at least in one direction.

In general, a stretching temperature is from room temperature to the melting point of sintered PTFE. In the case of uniaxial stretching, a draw ratio is from 1.1 to 3.0 times. In the case of biaxial stretching, a draw ratio in a first direction is at most about 2 times, and that in another direction perpendicular to the first direction is at most about 2 times.

The stretched PTFE film may be heat set at a temperature higher than the stretching temperature. By the heat setting, the film will not shrink around room temperature.

The porous PTFE film produced by the above process has an average pore size of 0.05 to 0.6 μm and a thickness of 2 to 8 μm.

Next, the present invention according to the second aspect is explained in detail.

The steps of the second process are substantially the same as those in the first process except that the emulsion of PTFE is coated on a surface of a porous PTFE substrate.

The porous PTFE substrate may be prepared by stretching an unsintered or semi-sintered PTFE article which is produced by paste extruding powder of emulsion polymerized PTFE and optionally stretching an extruded article. In the present invention, the porous PTFE substrate should not have been heated at the melting point of unsintered PTFE, namely about 347° C. or higher. If the PTFE substrate is heated at a temperature higher than the melting point of unsintered PTFE, it is difficult to stretch the PTFE substrate.

A thickness of the porous PTFE substrate is not critical. Preferably, the thickness is from 10 to 100 μm. Preferably, the porous PTFE substrate has an average pore size of 0.3 to 0.9 μm.

The porous PTFE substrate may be in the form of a film or a hollow fiber.

When the porous PTFE substrate is in the form of a film, the emulsion of PTFE is coated by conventional coating means such as a bar coater, a doctor knife or a curtain coater. When the porous PTFE substrate is in the form of a hollow fiber, the emulsion of PTFE is flowed in the hollow fiber or the hollow fiber is dipped in the emulsion of PTFE.

Subsequently, the coated emulsion is dried, semi-sintered, stretching and optionally heat set under the same conditions as above.

The produced multi-layer porous PTFE film of the present invention has an asymmetric pore profile, that is, a smaller pore size in the coated film side and a larger pore size in the PTFE substrate side. Since a part of the coated PTFE film is anchored in the porous PTFE substrate, the coated PTFE film is hardly peeled off from the substrate.

Since the porous PTFE film according to the present invention has a very thin thickness, it has good permeability for various fluids and can be widely used as a fine filtering filter medium of various gases or liquids in the semiconductor field, a film for the separation of hemocytes or germs in the medical field, and a material for sporting wears such as a skiing wear and a rain wear. In addition, since the porous PTFE film according to the present invention contains few impurities, it can be used as a concentration film for fruit juices, and a separation and purification film for fermentation products.

PREFERRED EMBODIMENTS OF THE INVENTION

The processes of the present invention will be illustrated by following Examples.

In Examples, properties of a porous PTFE film are measured as follows:

Particle size calculated from turbidity (Turbidity particle size)

Average Particle Size of Primary Particles

The particle size is determined by measuring a transmittance of light having a wavelength of 550 nm through a unit length of a polymer latex having a solid content of about 0.22% by weight and reading an average particle size from a calibration curve which is prepared from already measured transmittances of the polymer latexes and average particle sizes measured using an electron microscope.

Average Pore Size

Using the Coulter Porometer (manufactured by Coulter Electronics, USA), a mean flow pore size (MEP) is measured as an average pore size.

Film Thickness

Using the 1D-110 MH type film thickness measuring device (manufactured by Mitsutoyo), a film thickness is measured.

Porosity

A weight of a porous film pores of which is filled with water (W) by an ethanol substitution method and a weight ($W_0$) and a volume (V) of a bone dry porous film are measured and then a porosity is calculated according to the following equation:

Porosity (%) = $[(W - W_0)/V] \times 100$

Gas Flow Rate

A round sample film having a diameter of 25 mm is cut out from a porous film and set in a filter holder having an effective permeation area of 2.15 cm$^2$. The filter is then pressurized with nitrogen gas under 0.639 bar and an amount of permeated gas is measured by a mass flow meter. From the measured amount, a permeated amount per one minute (liter/min) is calculated. Since measured permeated amount (liter/min) varies with a film thickness or a filter area when the pore size and the pore structure are the same, the following reduced flow rate is used to compare the permeabilities of two or more different porous films:

Reduced flow rate (liter · mm/cm$^2$ · hr) =

$$\frac{60 \times \frac{\text{(measured permeated amount)}}{\text{(liter/min)}} \times \frac{\text{(film thickness)}}{\text{(mm)}}}{\text{Film area (cm}^2\text{)}}$$

EXAMPLE 1

An emulsion of PTFE having a turbidity particle size of 332, a resin solid content of 60% and a content of a nonionic surfactant of 9 parts by weight per 100 parts by weight of the resin solid (F104 manufactured Daikin Industries, Ltd.) (2 ml) was dropped on a glass plate and coated using a bar coater at a bar moving speed of 8 cm/sec.

The coated emulsion was kept standing at about 25° C. for one hour and heated in an IR drier at 80° C. for 10 minutes to remove water from the coated film.

The dried film on the glass substrate was semi-sintered in an electric furnace with internal air circulation kept at 341° C. for 28 minutes.

Then, the semi-sintered film was peeled off from the substrate. Its crystalline conversion was measured to be 0.35, and its thickness was 5 μm.

The semi-sintered film was uniaxially stretched at a draw ratio of 2.3 times to obtain a porous PTFE film. A scanning electron microscopic (SEM) photograph of the porous PTFE film is shown in FIG. 1.

The porous PTFE film had a thickness of 4 μm, a porosity of 42% and an average pore size of 0.59 μm. A flow rate of nitrogen gas under pressure of 0.639 bar was 46 liter/min.

EXAMPLE 2

In the same manner as in Example 1 but the semi-sintering was carried out for 35 minutes, a porous PTFE film was produced.

The unstretched semi-sintered PTFE film had a crystalline conversion of 0.67 and a thickness of 5 μm.

Figure 2:
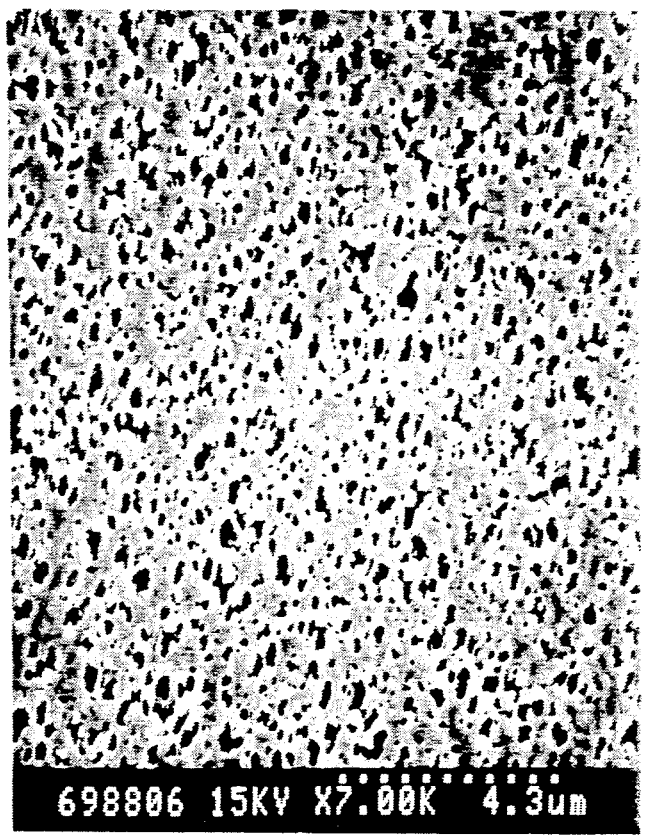

An SEM photograph of the porous PTFE film is shown in FIG. 2. The porous PTFE film had a thickness of 4 μm, a porosity of 38% and an average pore size of 0.09 μm. A flow rate of nitrogen gas under pressure of 0.639 bar was 0.45 liter/min.

EXAMPLE 3

Figure 3:
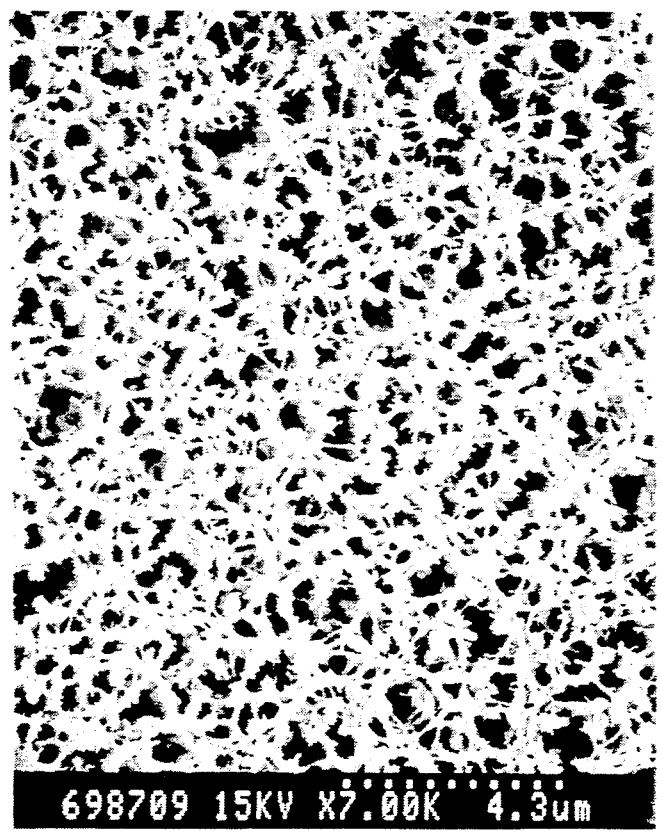

The semi-sintered PTFE film produced in Example 2 which had a crystalline conversion of 0.67 and a thickness m was stretched at a draw ratio of 1.6 times in a first direction and at a draw ratio of 1.6 times in a direction perpendicular to the first direction to obtain a porous An SEM photograph of the porous PTFE film is shown in FIG. 3. The porous PTFE film had a thickness of 4 μm, a porosity of 69% and an average pore size of 0.13 μm. A flow rate of nitrogen gas under pressure of 0.639 bar was 7.5 liter/min.

The properties of the porous PTFE film produced in Example 3 and those of a commercially available PTFE porous film (manufactured by Milipore) are compared in the following Table.

TABLE

| Film | Example 3 | Commercial film |
|---|---|---|
| Thickness | 4 μm | 9 μm |
| Minimum pore size | 0.094 μm | 0.098 μm |
| Maximum pore size | 0.165 μm | 0.170 μm |
| Average pore size | 0.129 μm | 0.145 μm |
| Measured flow rate | 7.54 l/min. | 2.42 l/min. |
| Reduced flow rate | 0.84 1 · mm/cm² · hr | 0.61 1 · mm/cm² · hr |

Though the porous PTFE film produced according to the present invention has a smaller average pore size than the commercially available porous PTFE film, it has a larger measured flow rate and also a larger reduced flow rate. This means that the porous PTFE film according to the present invention satisfies a need for a porous film having a small pore size and a large flow rate.

EXAMPLE 4

On a glass plate a porous PTFE film which has an average pore size of 0.93 μm and a film thickness of 68 μm and has not been heated at a melting point of unsintered PTFE or higher was placed. On the porous PTFE film, an emulsion of PTFE having a turbidity particle size of 332, a resin solid content of 60% and a content of a nonionic surfactant of 9 parts by weight per 100 parts by weight of the resin solid (F104 manufactured Daikin Industries, Ltd.) (2 ml) was dropped and coated using a bar coater at a bar moving speed of 8 cm/sec.

The coated emulsion was kept standing at about 25° C. for one hour and heated in an IR drier at 80° C. for 10 minutes to remove water from the coated film.

The dried film on the glass substrate was semi-sintered in an electric furnace with internal air circulation kept at 341° C. for 30 minutes. During semi-sintering, the edges of the porous PTFE film as a substrate were fixed to prevent shrinkage of the film. The total thickness of the semi-sintered multi-layer film was 73 μm.

The semi-sintered multi-layer film was stretched at a draw ratio of 1.5 times in a first direction and at a draw ratio of 1.5 times in a direction perpendicular to the first direction to obtain a porous PTFE film having an asymmetric pore size profile.

The multi-layer porous PTFE film had a thickness of 48 μm, a porosity of 92% and an average pore size was 0.55 μm. A flow rate of nitrogen gas under pressure of 0.639 bar was 23 liter/min.

EXAMPLE 5

In the same manner as in Example 4 but using, as a PTFE film substrate, a porous PTFE film having an average pore size of 0.35 μm and a film thickness of 56 μm, a multi-layer porous PTFE film having an asymmetric pore size profile was produced. The multi-layer porous PTFE film had a thickness of 27 μm, a porosity of 80% and an average pore size of 0.25 μm. A flow rate of nitrogen gas under pressure of 0.639 bar was 5.1 liter/min.

Figure 4:
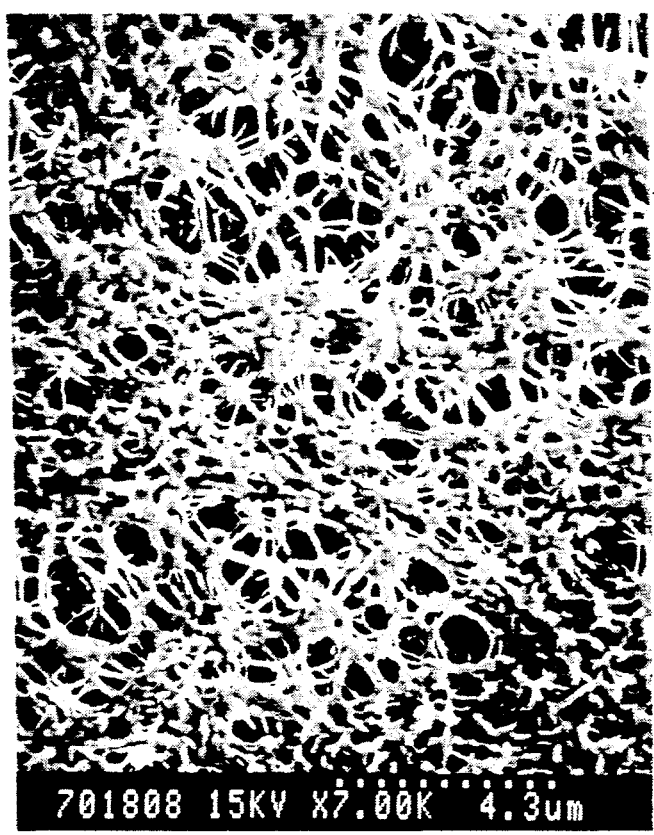
FIGS. 4 and 5 are scanning electron microscopic photographs (magnification: 7000 times) of the layer formed from the PTFE emulsion and the layer formed from the porous PTFE film of the multi-layer porous PTFE film produced in Example 5, respectively.
Figure 5:
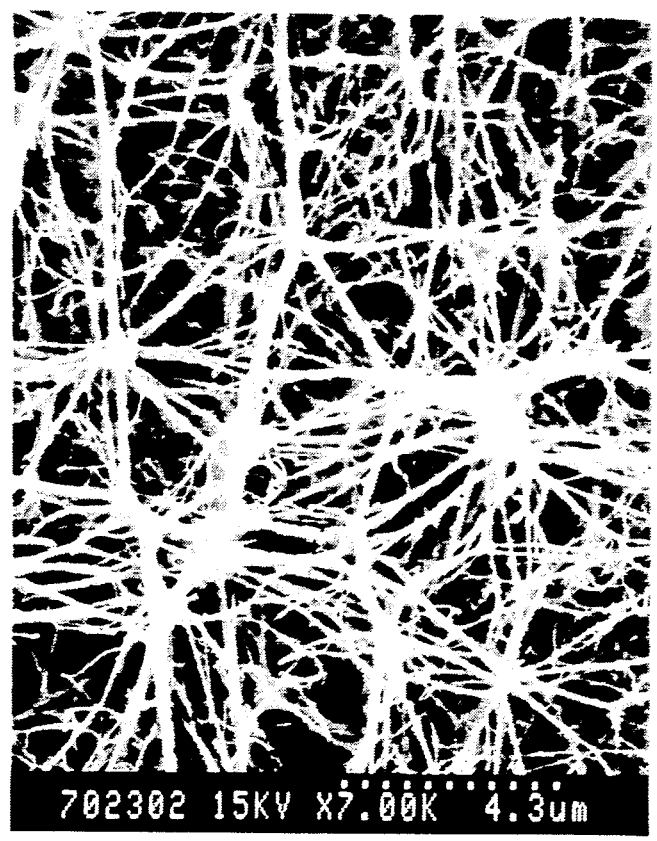

The SEM photographs of the layer formed from the PTFE emulsion and the layer formed from the porous PTFE film of the multi-layer porous PTFE film are shown in FIGS. 4 and 5, respectively. From FIGS. 4 and 5, the layer formed from the PTFE emulsion has a smaller pore size than the layer formed from the porous PTFE film.

What is claimed is:

1. A process for producing a porous polytetrafluoroethylene film comprising coating an emulsion of polytetrafluoroethylene on a substrate surface, heating the coated substrate at a temperature not lower than a melting point of sintered polytetrafluoroethylene to semi-sinter polytetrafluoroethylene, optionally removing the semi-sintered polytetrafluoroethylene film from the substrate, and then stretching the semi-sintered film at least in one direction.

2. The process according to claim 1, wherein said substrate has a smooth surface.

3. The process according to claim 1, wherein said semi-sintered polytetrafluoroethylene film is peeled off from the substrate and stretched.

4. The process according to claim 1, wherein said semi-sintered, polytetrafluoroethylene film is biaxially stretched.

5. A process for producing a multi-layer porous polytetrafluoroethylene film comprising at least two layers having different average pore sizes, which process comprises coating an emulsion of polytetrafluoroethylene on a porous polytetrafluoroethylene substrate which has not been heated at a melting point of unsintered polytetrafluoroethylene or higher, heating a coated polytetrafluoroethylene substrate at a temperature not lower than a melting point of sintered polytetrafluoroethylene to semi-sintered polytetrafluoroethylene, and stretching a composite of the coated film and the substrate at least in one direction.

6. The process according to claim 5, wherein said polytetrafluoroethylene substrate has a thickness of 10 to 100 μm and an average pore size of 0.3 to 0.9 μm.

7. The process according to claim 5, wherein said polytetrafluoroethylene substrate is in the form of a film.

8. The process according to claim 5, wherein said polytetrafluoroethylene substrate is in the form of a hollow fiber.

9. The process according to claim 3, wherein said film is uniaxially stretched at a draw ratio of from 1.1 to 3.0 times.

10. The process according to claim 4, wherein said film is biaxially stretched at a draw ratio in a first direction at most about 2 times, and in another direction perpendicular to the first direction at most about 2 times.

* * * * *